US008422491B2

(12) United States Patent
Fulknier et al.

(10) Patent No.: US 8,422,491 B2
(45) Date of Patent: Apr. 16, 2013

(54) MOBILE NETWORK CONFIGURATION AND METHOD

(75) Inventors: John C. Fulknier, Charlestown, MA (US); Brian J. Smith, Somerville, MA (US)

(73) Assignee: WAAV Inc., Cambridge, MA (US)

( * ) Notice: Subject to any disclaimer, the term of this patent is extended or adjusted under 35 U.S.C. 154(b) by 1246 days.

(21) Appl. No.: 12/148,377

(22) Filed: Apr. 18, 2008

(65) Prior Publication Data

US 2010/0020753 A1    Jan. 28, 2010

Related U.S. Application Data

(60) Provisional application No. 60/925,041, filed on Apr. 18, 2007.

(51) Int. Cl.
*H04L 12/56* (2006.01)
(52) U.S. Cl.
USPC ............ 370/389; 370/352; 370/432; 370/463
(58) Field of Classification Search .................. 307/225, 307/328, 329, 338, 352; 455/456.1; 709/310; 370/401, 352, 389, 432, 463
See application file for complete search history.

(56) References Cited

U.S. PATENT DOCUMENTS

| | | | |
|---|---|---|---|
| 5,771,229 A | 6/1998 | Gavrilovch | |
| 6,252,883 B1 | 6/2001 | Schweickart et al. | |
| 6,253,247 B1 | 6/2001 | Bhaskar et al. | |
| 6,295,276 B1 | 9/2001 | Datta et al. | |
| 6,411,632 B2 | 6/2002 | Lindgren et al. | |
| 6,493,341 B1 | 12/2002 | Datta et al. | |
| 6,560,443 B1 | 5/2003 | Vaisanen et al. | |
| 6,563,821 B1 | 5/2003 | Hong et al. | |
| 6,636,516 B1 | 10/2003 | Yamano | |
| 6,747,964 B1 | 6/2004 | Bender | |
| 6,757,269 B2 * | 6/2004 | Dorenbosch et al. ......... 370/338 |
| 6,816,579 B2 | 11/2004 | Donovan et al. | |
| 6,842,446 B2 | 1/2005 | Everson et al. | |
| 6,934,266 B2 | 8/2005 | Dulin et al. | |

(Continued)

OTHER PUBLICATIONS

Hung Yun et al. A Transport Layer Approach for Achieving Aggregate Bandwidths on Multihomed Mobile Hosts, MOBICOM'02, Sep. 23-26, 2002, Atlanta, Georgia.

(Continued)

*Primary Examiner* — Hassan Kizou
*Assistant Examiner* — Toan Nguyen
(74) *Attorney, Agent, or Firm* — Invention Management Associates Inc.; Edward L. Kelley

(57) ABSTRACT

A mobile network configuration 500 includes a mobile router 525 forming one or more mobile subnets and including a plurality of cellular network interface devices 552, 554, 556, 558 installed thereon. The mobile network 500 further includes a network controller 520 installed as a node on a WAN 515. The mobile network 500 utilizes one or more cellular networks 505, 510 to provide network access to the WAN 515 via gateways 568, 570. The mobile router 525 provides a network interface between one or more local subnets 530, 535 and the at least one cellular network 505, 510. The mobile network 500 operates to establish an IP tunnel between the mobile router 525 and the network controller 520 for each of the plurality of cellular network interface devices 552, 554, 556, 558 installed on the mobile router 525 and to exchange network traffic between the mobile router and the network controller over any one of the IP tunnels.

21 Claims, 5 Drawing Sheets

U.S. PATENT DOCUMENTS

| | | | |
|---|---|---|---|
| 6,963,579 B2 | 11/2005 | Suri | |
| 7,010,298 B2 | 3/2006 | Seedman et al. | |
| 7,068,624 B1 | 6/2006 | Dantu et al. | |
| 7,068,669 B2 | 6/2006 | Abrol et al. | |
| 7,089,312 B2 | 8/2006 | Liu et al. | |
| 7,092,399 B1 | 8/2006 | Cheriton | |
| 7,110,880 B2 | 9/2006 | Breed et al. | |
| 7,120,148 B1 | 10/2006 | Batz et al. | |
| 7,130,616 B2 | 10/2006 | Junik | |
| 7,130,625 B2 | 10/2006 | Akgun et al. | |
| 7,133,404 B1 | 11/2006 | Alkhatib et al. | |
| 7,136,645 B2 | 11/2006 | Hanson et al. | |
| 7,139,841 B1 | 11/2006 | Somasundaram et al. | |
| 7,143,169 B1 | 11/2006 | Champagne et al. | |
| 7,493,381 B2 | 2/2009 | Garg | |
| 7,508,754 B1* | 3/2009 | Sankaranaraynan et al. | 370/225 |
| 7,539,175 B2 | 5/2009 | White et al. | |
| 7,542,456 B2 | 6/2009 | Garg et al. | |
| 2002/0122394 A1* | 9/2002 | Whitmore et al. | 370/328 |
| 2003/0131139 A1* | 7/2003 | Broussard | 709/310 |
| 2003/0223450 A1 | 12/2003 | Bender et al. | |
| 2004/0105449 A1* | 6/2004 | Jung et al. | 370/401 |
| 2004/0203740 A1 | 10/2004 | Won et al. | |
| 2004/0203906 A1* | 10/2004 | Kato et al. | 455/456.1 |
| 2004/0266348 A1 | 12/2004 | Deshpande et al. | |
| 2006/0193295 A1 | 8/2006 | White et al. | |
| 2006/0291449 A1* | 12/2006 | Babbar et al. | 370/352 |
| 2007/0030857 A1 | 2/2007 | Fulknier et al. | |
| 2007/0110017 A1 | 5/2007 | Fulknier et al. | |

OTHER PUBLICATIONS

Phatak et al. A Novel Mechanism for Data Streaming Across Multiple IP Links for Improving Throughput and Reliability in Mobile Environments INFOCOM vol. 2 p. 773-781 Nov. 2002.

A. K. Salkintzis et al. WLAN-GPRS Integration for Next-Generation Mobile Data Networks IEEE Wireless Communications • Oct. 2002 vol. 9.

Web page content of Junxion Inc. www.junction.com printed on Jan. 6, 2007. p. 1-3 product.

Web page content of Junction Inc. www.junction.com printed on Jan. 6, 2007 p. 1-2 solution.

Junction Inc. Field Commander remote management overview dated Oct. 1, 2006 s pages.

Junction Box User Guide pp. 3-35 downloaded from www.junction.com on Jan. 6, 2007.

* cited by examiner

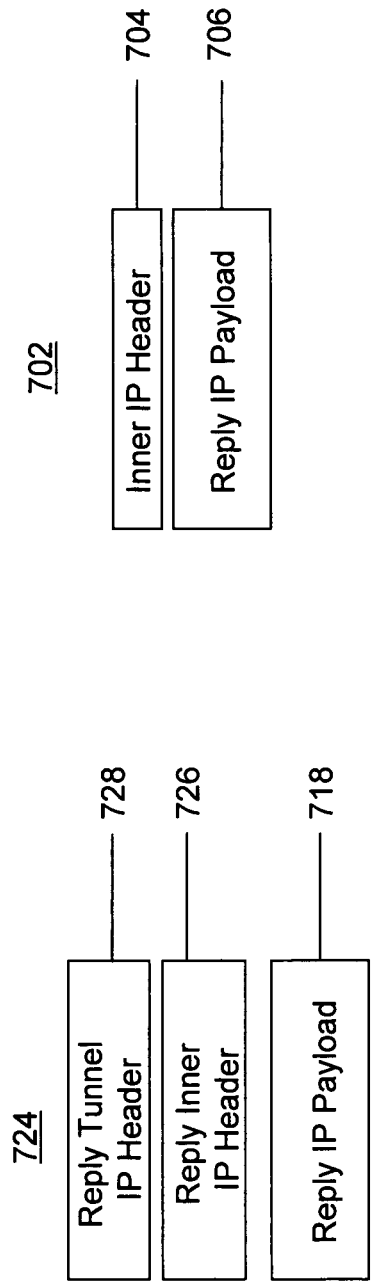

MOBILE NETWORK CONFIGURATION AND METHOD

CROSS REFERENCE TO PRIOR APPLICATIONS

This application claims priority under 35 U.S.C. 119(e) to Provisional Application Ser. No. 60/925,041, entitled NETWORK CONFIGURATION FOR MANAGING NETWORK TRAFFIC TO A MOBILE ROUTER, by Fulknier et al., filed on Apr. 18, 2007, which is incorporated herein by reference in its entirety.

BACKGROUND OF THE INVENTION

1. Field of the Invention

The present invention relates to a mobile network configuration and method for operating a mobile network configuration. In particular, the mobile network includes a network controller operating as a nod on a WAN and a plurality of mobile subnets with at least two communication links established between each mobile subnet and the network controller.

2. Description of the Related Art

Mobile subnets configured to establish two or more communication links with a cellular network to access a WAN are known. One such mobile subnet is disclosed in copending and commonly assigned patent application Ser. No. 11/650,634 by Fulknier et al. filed on Jan. 6, 2007, entitled MOBILE ROUTER DEVICE. As described therein, two or more mobile router devices each having a single cellular network interface device installed thereon are interconnected or stacked together and controlled by a master router. The master router directs each cellular network interface device to establish a communication channel or link with a cellular network and directs outgoing network traffic to the cellular network over any one of the communication channels. Moreover any outgoing network traffic is routed directly to its destination IP address e.g. on a WAN.

One advantage of the router stack disclosed in the '634 reference is that the master router operates to distribute network traffic exiting from the router stack over all of the available communication channels and the network traffic can be equally load balanced over the available communication channels or otherwise routed to any one of the available communication channels according to network conditions, channel conditions, and other factors.

The router stack disclosed in the '634 reference operates such that any reply traffic responsive to the network traffic exiting from the router stack is returned to the router stack over the same communication channel that it exited the router stack over. One problem with the '634 reference network configuration occurs when one or more of the communication channels is no longer available or when an IP address assigned to one or more of the communication channels is changed. As a result, reply traffic can be lost when one of the communication channels is no longer available or its IP address is changed. Another problem with the '634 reference network configuration occurs when reply traffic bandwidth is wider than channel bandwidth capacity and this can degrade the overall performance of the mobile subnet. Accordingly there is a need in the art to control the distribution of reply traffic to a mobile subnet by directing reply data traffic over any the available communication channels as demanded by instantaneous network conditions.

SUMMARY OF THE INVENTION

The present invention overcomes the problems cited in the prior art by providing a mobile network configuration 500, 800 that includes a network controller 520 operating as a node on a public WAN 515 or a private WAN 640. The network controller 520 includes a controller microprocessor 610 preferably configured for network routing and other network data manipulation and a controller memory module 615 interconnected with the controller microprocessor 610. The network controller 520 includes one or more WAN network interface devices 605 and 645 configured as broadband or wide bandwidth network interface devices forming a network interface between the WAN 515, 640 and the controller microprocessor 610.

The mobile network configuration 500, 800 includes one or more mobile subnets A-D operating as a network interface between one or more local subnets WLAN 530 and LAN 535 and one or more cellular networks 505, 510, 805 with each cellular network having a network gateway 568, 570, 815 to the WAN 515, the WAN 640, or both. Each mobile subnet A-D includes a subnet microprocessor and interconnected subnet memory module 526 as well as one or more network interface devices 545, 550, 559 forming a network interface between locally reachable network devices on a WLAN 530, a LAN 535, or other network devices in communication with the subnet microprocessor. In addition, each mobile subnet A-D includes at least two cellular network interface devices 552, 554, 556, 558 forming a network interface between the subnet microprocessor 526 and a cellular network 505, 510, 805.

The mobile network configuration 500, 800 includes first program steps stored and operating on the mobile subnets A-D for routing subnet exit data packets 708 originating in one of the locally reachable devices or networks 530, 535 to the network controller 520 over any one of the plurality of cellular network interface devices 552, 554, 556, 558. In particular, the first program steps reconfigure network data packets received from the locally reachable devices or networks and having non-locally reachable destination IP addresses by adding a IP tunnel header 710 to each data packet and the tunnel IP header includes as its destination IP address an IP address assigned to one of the network controller WAN network interface devices 605 or 645. In addition, the mobile network configuration 500, 800 includes second program steps stored and operating on the network controller 520 for routing subnet exit data packets 708 to IP destination addresses listed therein and for tracking which mobile subnet the subnet exit data packets were received from. The second program steps also receive reply data packets 712 responsive to the subnet exit data packets 708, and route the reply data packets 712 to the corresponding mobile subnet A-D that the subnet exit data packets were received from over any one of the plurality of cellular network interface devices 552, 554, 556, 558 installed on the corresponding mobile subnet.

The present invention further overcomes the problems cited in the prior art by providing a method for operating a mobile network 500, 800 including operating a network controller 520 as a node on a WAN 515, 640 and operating one or more mobile subnets A-D over a geographic region. The method includes using the mobile subnets A-D to form a network interface between one or more local subnets 530, 535 associated with a mobile subnet and a cellular network 505, 510, 805 that includes a network gateway 568, 570, 815 to the WAN 515, 640 or both. The method includes establishing a plurality of communication channels 560, 562, 564, 566 between each subnet A-D and one or more cellular networks 505, 510, 805 and routing subnet exit data packets 708 originating in the one or more local subnets 530, 535 or other network devices associated with the mobile subnet A-D to the network controller 520 over any one of the plurality of communication channels 560, 562, 564, 566. In addition, the method includes receiving subnet exit data packets in the network controller 520 and routing each subnet exit data packet 708 received by the network controller to an IP destination address listed in a header of each subnet exit data packet 708. If the exit data packet generates a reply data packet transmitted from the destination IP address of the exit data packet, the reply data packet is received in the network controller 520 and matched with a corresponding exit data packet and a corresponding mobile subnet A-D and routed to the corresponding mobile subnet over any one of the plurality of communication channels 560, 562, 564, 566 according to a routing scheme.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 7 illustrates an example reply tunnel data packet according to the present invention.

FIG. 8 illustrates an example subnet reply data packet.

DESCRIPTION OF THE PREFERRED EMBODIMENTS

Figure 1:
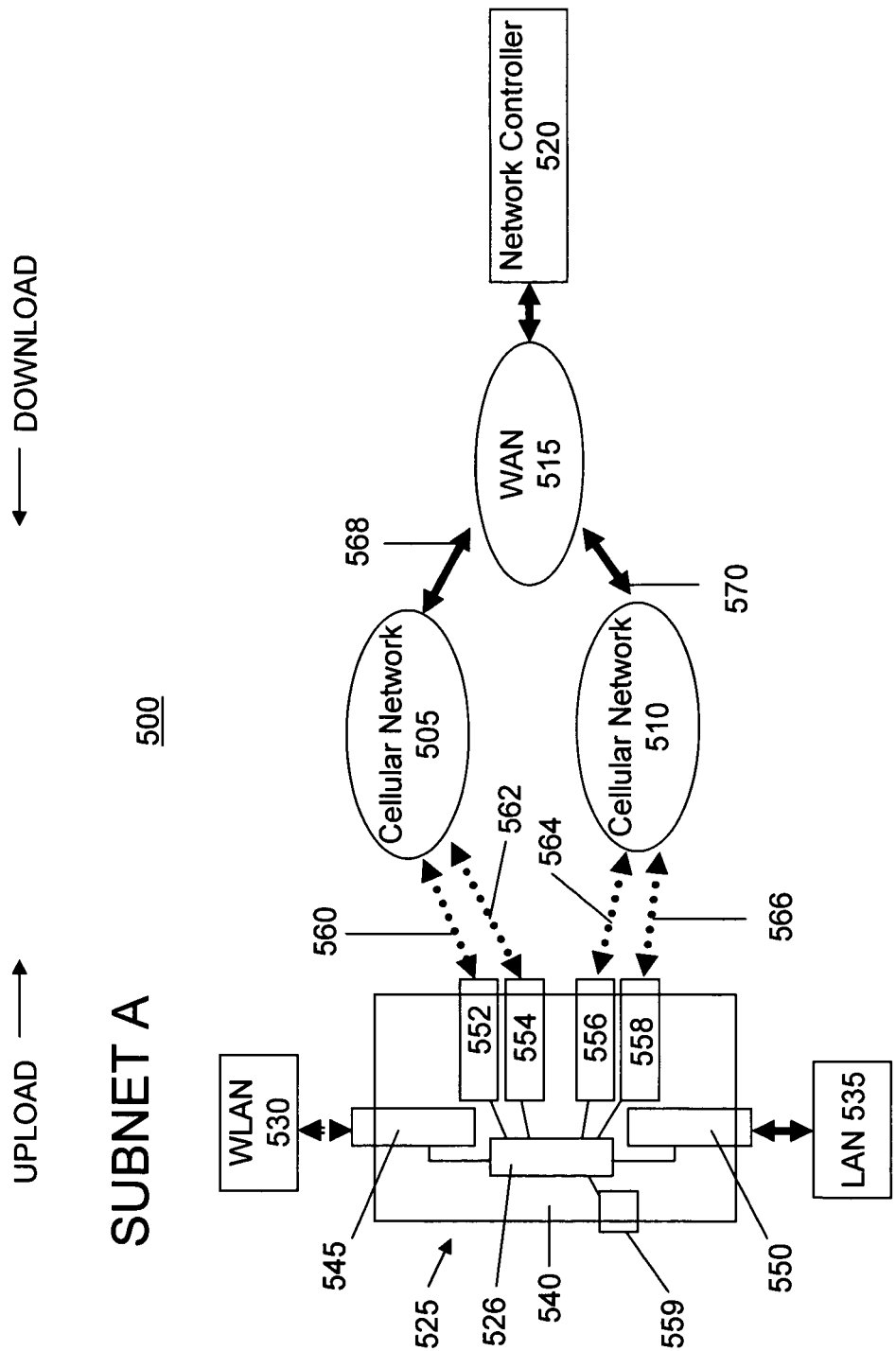
FIG. 1 illustrates a first mobile network configuration according to the present invention.

Referring now to FIG. 1, a first mobile network configuration 500 includes a network subnet A, one or more cellular networks 505 and 510, a Wide Area Network WAN 515, such as the Internet or world wide web, a private network or other wide area network configurations, and a network controller 520, such as a server installed as a node on the WAN 515. The subnet A comprises a mobile router 525 for establishing at least one local subnet such as a WLAN 530, a LAN 535, or both, and for establishing a network interface between local subnets 530, 535 and at least one cellular network 505, 510. The mobile router 525 includes a subnet controller 540. The subnet controller 540 at least includes a microprocessor and associated memory module 526 and a plurality of network interface devices, 552, 554, 556, 558, 545, 550, 559 interconnected with the microprocessor and associated memory module 526 and configured to exchange network data packets with the microprocessor and associated memory module 526. Additionally, the subnet controller 540 includes program steps stored and operating on the microprocessor and associated memory module 526 for reconfiguring or translating network data packet headers, and the like, for routing network traffic over network routing paths and for populating, storing and periodically updating one or more data tables and or other databases with network and network data packet related data.

In the example embodiment of FIG. 1, a WLAN configured network interface device 545 is provided to establish the WLAN 530, a LAN configured network interface device 550 is provided to establish the LAN 535 and one or more cellular configured network interface devices 552, 554, 556, 558 are provided to communicate with the first cellular network 505 and or the second cellular network 510. In addition, a satellite telecommunications network (STN) interface device 559, or the like, may also be installed on the subnet controller 540 or otherwise interfaced with the subnet controller 540 to communicate with the microprocessor and associated memory module 526 and with a STN. While the STN interface device 559 may interface with any of various STN public and private satellite networks, a particularly useful STN interface device 559 includes a Global Positioning System receiver for receiving signals from a Global Navigation Satellite System for regularly determining an instantaneous global position, velocity, heading and local time and communicating that information to the microprocessor and associated memory module 526.

In addition to the subnet A, described above and shown in FIG. 1, other example subnets usable with the present invention are described in commonly assigned U.S. patent application Ser. No. 11/497,892 by Fulknier et al. filed on Aug. 2, 2006, entitled MOBILE ROUTER DEVICE and in commonly assigned U.S. patent application Ser. No. 11/650,634 by Fulknier et al. filed on Jan. 6, 2007, entitled MOBILE ROUTER DEVICE, both of which are incorporated herein by reference in their entirety.

In operation, the mobile router 525 communicates with locally reachable devices on the WLAN 530 and or LAN 535 and assigns each locally reachable device with a local or subnet IP address that identifies the device subnet network and subnet node. Additionally, the mobile router 525 communicates with the first cellular network 505 over the first cellular network interface device 552 to establish a first subnet to cellular network communication channel 560. Once established, the first cellular network 505 assigns the first cellular network interface device 552 with a first IP address. The first IP address may comprise a public IP address, a private IP address, a subnet IP address or any other public or private network address usable to uniquely identify the first cellular network device 552 as a node on the cellular network 505.

If the mobile router 525 includes a second cellular network interface device 554, a second subnet to cellular network communication channel 562 is established with the first cellular network 505 and the first cellular network 505 assigns the second cellular network interface device 554 with a second IP address. Similarly, the mobile router 525 may include a third cellular network interface device 556 and a fourth cellular network interface device 558 each configured to communicate with the second cellular network 510 over third and fourth subnet to cellular network communication channels 564 and 566. Once established, the second cellular network 510 assigns the third and fourth cellular network interface devices 556, 558 with corresponding third and a fourth IP addresses.

Alternately, the mobile router 525 may be configured with all of its cellular network interface devices 552, 554, 556 and 558 communicating with a single cellular network, (e.g. 505), or with each of its cellular network interface devices 552, 554, 556 and 558 communicating with a different cellular network such as when there are four different cellular networks available in the local region. More generally, the mobile router 525 may include one or more cellular network interface devices communicating with one or more cellular networks to provide at least two different cellular network communication channels. In one particularly useful embodiment, of the present invention, the subnet A includes two cellular network interface devices 552 and 554 communicating with a single cellular network 505 over two independent communication channels 560, 562.

The first and second cellular networks 505 and 510 may comprise similar cellular networks such as two commercial cellular telephone networks each using radio frequencies approximately center around commercial cellular telephone network radio, microwave or other frequency bands such as around 700, 800 or 900 MHz, around 1.8, 1.9 or 2.1 GHz, or around any other communication frequency bands assigned to cellular networks. Moreover the cellular networks 505 and 510 are preferably configured for wireless digital transfer using a suitable digital data transfer protocol such as High Speed Downlink Packet Access (HSDPA) and High-Speed Uplink Packet Access (HSUPA), Code Division Multiple Access (CDMA), Evolution-Data Optimized (EVDO), Enhanced Data Rates for GSM Evolution (EDGE), General Packet Radio Service (GPRS) Third Generation Partnership Program Long Term Evolution (3GPP LTE) or any other digital data transfer protocol for wireless data transfer over radio, microwave or frequency bands used in wireless networks.

Alternately, the first and second cellular networks 505 and 510 may comprise two different cellular networks, such as when the first cellular network 505 comprises a commercial cellular telephone network using frequency bands reserved for commercial networks and the second cellular network 510 comprises a private, municipal, law enforcement, public safety, military or other non-public network such as a public safety network using frequencies approximately centered around 4.9 GHz. Alternately, one cellular network may comprise a World Wide Operability for Microwave Access (WiMax) network or a Metropolitan Area Network (MAN), using frequencies approximately centered around 2.1, 2.5, 3.5 or 5.8 GHz. More generally, the first and second cellular networks 505, 510 may comprise any two cellular networks having different characteristics, such different wireless communication frequency bands, different data transfer protocols, different access requirements, that may require two different cellular network interface devices 552 and 556 installed on the mobile router 525.

Generally, the mobile router 525 is configured to operate with a desired set of cellular networks 505 and 510 by installing one or more cellular network interface devices (552, 554, 556, 558) configured to communicate with each of the desired cellular networks thereon. In some applications it may be desirable for all of the cellular network interface devices (552, 554, 556, 558) to communicate with the same cellular network, e.g. the first cellular network 505. In other applications, it may be desirable for all but one of the cellular network interface devices 552, 554, 556 to communicate with the first cellular network 505 and for one cellular network interface devices 558 to communicate with the second cellular network 510. Accordingly, the configuration of the mobile router 525 is application dependent. Moreover, the mobile router 525 can be constructed with the subnet controller 540 having ports configured to receive interchangeable network interface devices therein. In one example, the mobile router 525 may include a plurality of card slot interfaces, not shown, configured to receive interchangeable PC cards therein. In addition, each cellular network interface device 552, 554, 556, 558 may be configured as an interchangeable PC card such that a user or manufacturer may reconfigure the mobile router 525 by installing a desired set of cellular network interface devices configured as PC cards into card slot interfaces on the mobile router 525 to configure the mobile router 525 to communicate with different cellular networks as may be required.

In the example embodiment shown in FIG. 1, the cellular network interface devices 552, 554 are configured to establish communication sessions 560, 562 with a local access point of the first cellular network 505, (e.g. a cellular network tower), and the cellular network interface devices 556, 558 are configured to establish communication channels 564, 566 with a local access point of the second cellular network 510. In this example, when the subnet A has communication access to both the first and the second cellular networks, all four communication channels can be established and the subnet is fully interfaced. Otherwise the subnet A may be less than fully interfaced and the interface level may vary as the subnet moves over geographic regions.

As described above, the mobile router 525 establishes communication sessions between the subnet A and local access points of the cellular networks 505 and 510 and each communication channel 560, 562, 564, 566 and a different IP address assigned to its cellular network interface device 552, 554, 556, 558. As the mobile subnet A moves over a geographic region, communication channels may be handed off from one cellular network access point to another without terminating the communication channel and without changing the IP address associated with the cellular network device 552, 554, 556, 558 associated with the communication channel. However, if a communication channel is some how terminated or dropped, the IP address assigned to the dropped cellular network interface device may be lost. After a drop or termination, a new communication channel is established by the corresponding cellular network interface device when a suitable cellular network access point becomes available and the initiation of the new communication channel may include assigning the corresponding cellular network interface device with a new IP address. In cases where a cellular network provides roaming access to other cellular networks, communication channel hand-offs may be made to pass a communication channel from one cellular network to another without interrupting the communication channel or changing the IP address of the cellular network interface device associated with the communication channel.

Referring now to FIG. 1, the mobile router 525 has four distinct and separate communication channels usable as network routes to the network controller 520. First and second network routes include the cellular network interface devices 552, 554, the communication channels 560, 562, the first cellular network 505, the WAN gateway 568 and the WAN 515. Third and fourth network routes include the cellular network interface devices 556, 558, the communication channels 564, 566, the second cellular network 510, the WAN gateway 570 and the WAN 515.

According to a preferred embodiment of the present invention, at least two of the communication channels are always utilized to exchange network traffic between the mobile subnet A and the network controller 520. In the example of FIG. 1, the mobile router 525 operates to upload network traffic from the subnet A to the network controller 520 using each of the four network routes to the network controller 520 and to download network traffic from the network controller 520 to the subnet A also using each of the four network routes. More specifically, network traffic being upload form the subnet A to the network controller 520 has a source IP address corresponding with an IP address assigned to any one of cellular network interface device 552, 554, 556 and 558 and a destination IP address corresponding with a WAN IP address assigned to the network controller 520. Conversely, network traffic being downloaded from the network controller 520 to the subnet A, has a source address corresponding with the WAN IP address of the network controller 520 and as a destination IP address an IP address assigned to any one of cellular network interface device 552, 554, 556 and 558.

In operation, the subnet controller 540 uses Network Address Translation, (NAT) and or Network Address Port Translation, (NAPT) to receive network traffic from the subnets 530 and 535, and then route the subnet traffic to the network controller 520. The subnet controller 540 also receives reply network traffic responsive to subnet network traffic sent to the network controller 520 and routes the reply network traffic to appropriate subnet source IP addresses on the subnets. More specifically, when the microprocessor and associated memory module 526 receives a network data packet from a device connected with the WLAN 530 and or LAN 535, it reads the data packet header to determine the data packet subnet source IP address, its destination IP address, a reply port assignment, and any other routing or network related information that may be included in the data packet header. The subnet controller 540 then stores some or all of the local data packet header information in data fields such as a routing table or other database stored on the subnet controller 540. If the data packet destination IP address is a locally reachable subnet IP address, the subnet controller 540 may route the data packet to the locally reachable subnet IP address without changing the packet header. If the data packet destination IP address is not a locally reachable subnet IP address, the subnet controller 540 assigns a network route to the data packet. The assigned network route determines which cellular network interface device 552, 554, 556, 558 will be used to route the network packet out of the subnet A and which IP address associated with the selected cellular network interface device 552, 554, 556, 558 will be used at the source IP address of the data packet. According to an important aspect of the present invention, the subnet controller 540 directs substantially all network traffic exiting the subnet A to the network controller 520.

Figure 2:
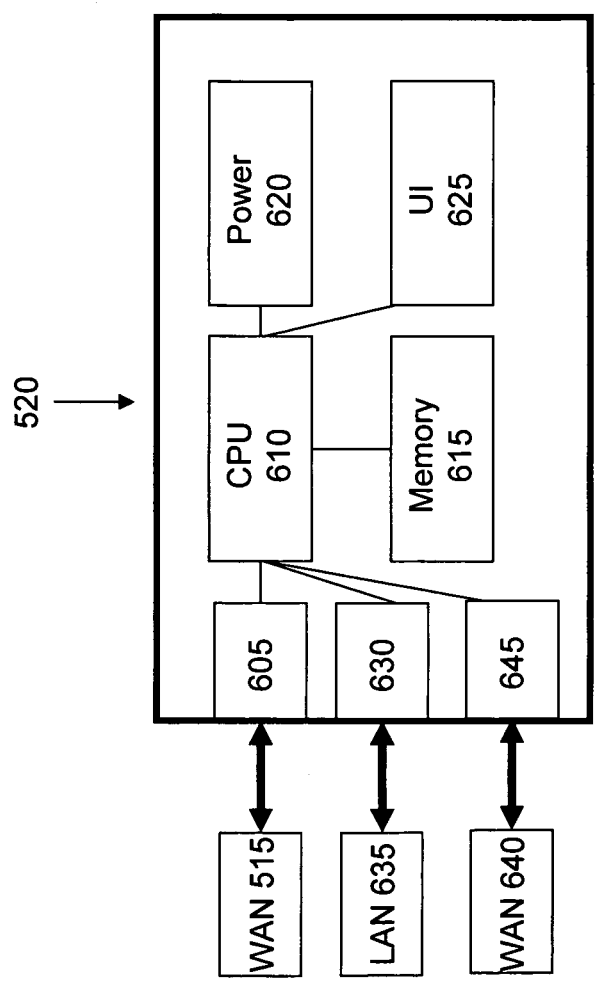
FIG. 2 illustrates a network controller according to the present invention.

Referring now to FIG. 2, in one example embodiment, the network controller 520 comprises an internet server installed as a node on the WAN 515. The network controller 520 includes one or more network interface devices 605 such as a wire Ethernet, cable modem or other broadband high speed network gateway interconnected with the WAN 515 with each network interface devices 605 having an IP address or other network node identifier. The network controller 520 further includes one or more digital microprocessors or central processing units, (CPU) 610 and memory modules 615 interconnected therewith. The network controller 520 also includes a power supply module 620, and may include a user interface module, (UI), 625, such as a keyboard, mouse and video monitor or other suitable user interface devices.

In another example embodiment the network controller 520 comprises an internet server installed as a node on the private WAN 640 by a network interface device 645 such as a wire Ethernet, cable modem or other broadband high speed network gateway. The private WAN 640 includes a network gateway connected to each of the cellular networks 505, 510 and other cellular networks as may be required to function like the WAN 515 shown in FIG. 1. When using the private WAN 640, the network interface device 645 has a private IP address not reachable except through the private WAN 640.

In both example embodiments, the network controller 520 may include additional network interface devices 630 for communicating with other networks such a LAN 635, a satellite network, telephone switching network, cellular network, WLAN, or any other network, not shown, as may be required, and the other network interface devices 630 each has a private or public IP address assigned thereto. In particular, the network controller 520 may be associated with a subnet LAN 635 or private WAN 640 comprising a plurality of network servers, data storage devices, and other devices as may be required to support the operation of the network controller 520 to interface with a plurality of mobile subnets, cellular networks e.g. 505 and 510 or WAN's 515 as may be required.

Generally, the network controller 520 includes program steps stored and operating on the one or more digital microprocessors 610 and memory modules 615 to receive network traffic in and route network traffic out using NAT and or NAPT to track and route individual data packets as required. For example, network data packets are received from the mobile router 520 over the WAN 515 or private WAN 640 and each data packet is read by the microprocessor 610 to determine an ultimate destination IP address, e.g. on the WAN 515, of the packet and the packet is reconfigured for routing to the ultimate destination IP address over a selected route. For each data packet, the digital microprocessors 610 and memory modules 615 also store network routing instructions and packet information in data fields such in routing tables and or databases, for tracking the data packet route, and for routing any reply data packets responsive to the data packet back to its origin such as a device on one of the mobile subnets 530, 535.

Referring to FIGS. 1 and 2, according to a further aspect of the present invention, the subnet controller 540 and network controller 520 cooperate to establish one or more IP tunnels between the subnet A and the network controller 520. Each IP tunnel extends from one of the cellular network interface devices 552, 554, 556 or 558 to the network controller 520 and passes over at least one cellular network, e.g. 505 or 510 and over the WAN 515 or a suitable private WAN 640 interconnected between the cellular networks 505 and 510 and the network controller 520. IP tunnels between the subnet A and the network controller 520 are established by reconfiguring or translating network data packets to insert temporary routing information into the data packet headers. According to the present invention, substantially all of the network traffic exiting from the subnet A is routed to the network controller 520 before being routed to its final destination IP address on the WAN 515 or any other network device reachable by the network controller 520. Moreover, both the network controller 520 and the subnet controller 540 use Network Address Translation, (NAT) and or Network Address Port Translation, (NAPT) to upload data traffic from the subnet A and the network controller 520, to route data traffic from the network controller 520 to destination IP address on the WAN 515 or other networks to receive reply data traffic between the IP destination addresses and the network controller 520 and to download the reply data traffic from the network controller 520 to the subnet A.

Figure 3:
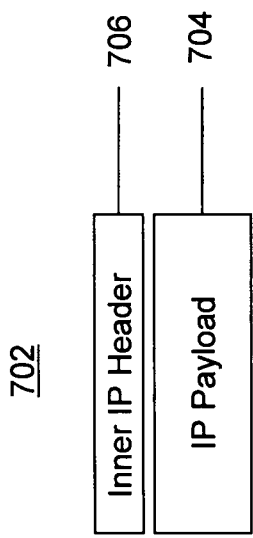
FIG. 3 illustrates an example subnet data packet.

Referring now to FIGS. 1 and 3, a subnet data packet 702 originating at a source device locally connected to the subnet A includes an IP payload 704, and an inner IP header 706. The packet may also include a footer, not shown. The inner IP header 706 at least includes a source IP address, a destination IP address and control information. The source IP address is the local or subnet IP address assigned to the source device. The source device may be any client device of the WLAN 530, the LAN 535 or any other network device communicating with to the subnet A other than over one of the cellular network interface devices 552, 554, 556, 558. The destination IP address may comprise any destination IP address such as a locally reachable subnet IP address or a non-locally reachable IP address such as on the WAN 515, WAN 640. Generally, the source and destination IP addresses are 32-bit addresses. The control information may include packet IP version, header length, packet length, type or quality of service, packet ID tag, fragmentation and offset data, protocol, a check sum for error detection, time to live, (TTL), a reply port assignment or any other data usable to identify and route the IP payload 704 to its destination IP address and to route reply data packets responsive to the IP payload 704 from the destination IP address back to the subnet source IP address as required. Moreover, as will be described below, according to the present invention, the mobile router 525 and the network controller 520 cooperate to route the IP payloads 704 originating in the subnet A to appropriate destination IP addresses and to route reply packets responsive to the IP payloads 704 from the destination IP address back to appropriate source IP addresses reachable by the subnet A as the subnet moves over a geographic region covered by cellular networks.

Upon receiving the subnet data packet 702, the subnet controller 540 reads the inner IP header 706 and stores the packet source IP address, destination IP address and selected control information in data fields, such as in a data table or database, e.g. a routing table maintained by the microprocessor and associated memory module 526. More specifically, the data table or database is configured to relate each subnet data packet 702 with the subnet route or network interface device and the source device that the packet was received from. Thereafter, the subnet controller 540 determines if the subnet packet destination IP address is locally reachable and if so, routes the subnet data packet 702 to the locally reachable device. If the locally reachable device generates a reply packet responsive to the subnet data packet 702, the reply packet is communicated to the subnet controller 540. The subnet controller 540 reads the reply packet inner header and associates the reply packet with the appropriate subnet data packet 702 that generated the reply packet by matching source and destination addresses, packet tag ID or other control data as may be required. Thereafter, the reply packet is routed to the source IP address the subnet data packet 702 over the subnet reply port specified in the subnet data packet inner header 706.

If the destination IP address of the subnet data packet 702 is not locally reachable, the subnet controller 540 selects a network route associated with one of the cellular network interface devices 552, 554, 556 and 558 and reconfigures or translates the subnet data packet 702 for routing to the network controller 520. In this case, the subnet data packet 702 is reconfigured to form a subnet exit data packet 708.

Figure 4:
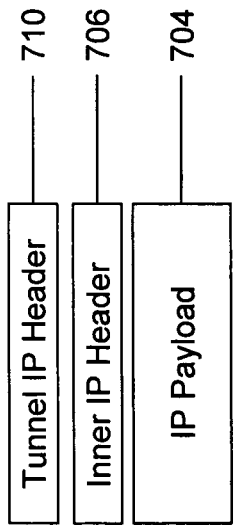
FIG. 4 illustrates an example subnet exit data packet according to the present invention.

Referring to FIG. 4, each subnet data packet 702 having a destination IP address that is not reachable over the subnet A is reconfigured as subnet exit data packet 708 by adding a tunnel header 710 preceding the inner IP header 706 and the subnet data packet IP payload 704. The subnet controller 540 first reads the inner header 706, stores the source and destination IP addresses read there from in data fields stored on the subnet controller 540 and selects which one of the cellular network interface devices 552, 554, 556 and 558 will be used to route the subnet data packet 702 over based on control information read from the data packet inner IP header 706 and on route selection criteria stored on the mobile router 525.

Once a routing path is selected, the tunnel IP header 710 is constructed with a tunnel source IP address corresponding with a current IP address assigned to the cellular network interface device 552, 554, 556 and 558 associated with the selected routing path. The tunnel IP header 710 also includes a tunnel destination IP address, which according to the present invention is the IP address of the network controller 520. The tunnel IP header 710 may also include control information which is different from the control information stored in the inner IP header 706. In particular, the subnet controller 540 is configured to construct tunnel IP headers 710 as may be required to efficiently tunnel data packets to the network controller 520 and to receive reply data packets back there from. For example, the subnet controller 540 may construct IP headers using different versions, protocols, type or quality of service, reply ports, etc. as may be required to utilized a desired route between the subnet A and the subnet controller 520 or to otherwise optimize network performance. Moreover, the subnet controller 540 is also configured to construct tunnel IP headers 710 with control data that is usable to evaluate the performance of network routes between the subnet A and the network controller 520. In particular, the tunnel IP headers may include a time stamp and other control data that may be useful for measuring network route characteristics such as bandwidth, congestion and latency. In addition, each tunnel IP header 710 may also include a subnet ID that uniquely associates the data packet the mobile router of the subnet A. Generally, the tunnel IP header 710 encapsulates the inner IP header 706 thereby causing the inner IP header 706 to be ignored by other networks, such as the cellular networks 505 and 510 and the WAN 515.

The network controller 520 receives subnet exit data packets 708 from the subnet A, reads each tunnel IP header 710 and stores the source IP address and control data read from the tunnel IP header 710 in data fields stored on the network controller 520. The network controller 520 then removes the tunnel IP header 710, reads the inner IP header 706 and stores the exit packet destination IP address in the data fields with the source IP address and control data read from the tunnel IP header 710. The network controller 520 is configured to store data fields read from exit data packets 708 in data tables or databases stored on the network controller 520 and to relate each exit data packet 708 to its source subnet A, using one or all of the subnet ID, the source IP address assigned to the cellular network interface device 552, 554, 556, 558 used to route the exit data packet 708 to the network controller 520, the subnet source IP address read from the inner IP header 706 or any other data that uniquely associates an exit data packet 708 with the subnet A or a source IP address of assigned to the cellular network interface device 552, 554, 556, 558.

Figure 5:
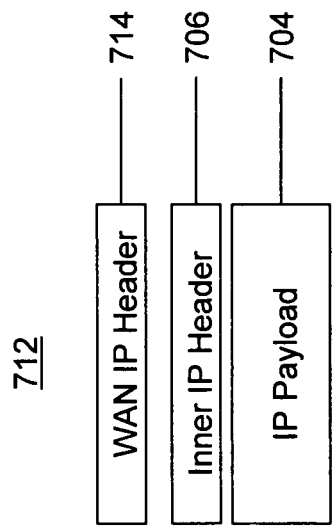
FIG. 5 illustrates an example WAN data packet according to the present invention.

Referring to FIG. 5, each exit data packet 708 is reconfigured as WAN data packet 712 by adding a WAN header 714 preceding the inner IP header 706 and the subnet data packet IP payload 704. The WAN data packet 712 includes the IP payload 704, the inner IP header 706 and a WAN header 714. The WAN header 714 encapsulates the inner header 706 thereby causing the inner IP header 706 to be ignored by other networks, such as the WAN 515. The WAN header 710 includes as its destination IP address, the destination IP address read from the inner IP header 706, and as its source IP address the IP address of the network controller 520. The WAN header 710 may also include control data such as packet size, packet ID, a time stamp, a reply port assignment and any other control data as may be selected by the network controller 520. Thereafter, the network controller 520 routes the WAN data packet 712 to its destination public IP address using routing data stored on the network controller 520. Once the WAN data packet 712 reaches its destination IP address, any reply data packets responsive to the WAN data packet 712 are returned to the network controller 520 over the a network controller reply port listed in the WAN header 710.

Figure 6:
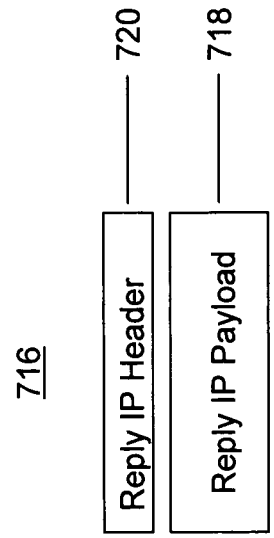
FIG. 6 illustrates an example reply data packet.

Referring now to FIG. 6, a reply data packet 716 comprises a data packet responsive to a WAN data packet 712. The reply data packet 716 includes a reply IP payload 718 and a reply IP header 720. The reply IP header 720 is generated by the network device associated with the destination IP address. The reply IP header 720 includes as its source IP address the destination IP address of the WAN data packet 712, as its destination IP address the IP address of the network controller 520, and as its reply port assignment the network controller reply port assignment read from the WAN IP header 714. The reply IP header 720 may also include other control data such as a packet size, a packet ID, a time stamp and any other data included therein by the network device associated with the destination IP address.

Upon receiving a reply data packet 716, the network controller 520 reads the reply IP header 720 and compares data in the reply IP header 720 with data stored in data tables on the network controller 520 to thereby match the reply data packet 716 with a corresponding WAN data packet 712. Once the corresponding WAN data packet 712 is identified, the network controller 520 uses data stored in data fields related to the WAN data packet 712 to match the reply data packet 716 with the corresponding tunnel data packet 706 and then with the corresponding subnet A that generated the subnet data packet 702. The corresponding subnet A that generated the subnet data packet 702 may be identified the, subnet data packet ID, the source IP address or the subnet ID read from the tunnel IP header 710 and stored by the network controller 520. Once the network controller 520 identifies the corresponding subnet A that generated the subnet data packet 702, the reply data packet 716 is prepared for routing there to.

The network controller 520 may be configured to select which cellular network interface device 552, 554, 556, 558 to route a particular reply tunnel packet 724 to the subnet A over according to various criteria including instantaneous network conditions, past performance of each network route, according to packet type or quality of service, by a preset routing sequence, e.g. to send an equal number of data packets over each available route or by various other criteria as may be suitable. Moreover, when an IP address of one of the cellular network interface device 552, 554, 556, 558 is changed, e.g. during a drop or a hand off, the network controller network 520 is configured to relate new IP addresses with prior IP addresses to ensure that reply data packets can be routed to the subnet A even after an IP address change.

Referring to FIGS. 6 and 7, once a routing path to the subnet A is selected, the reply IP header 720 is removed from the reply data packet 716 and a reply tunnel IP header 728 is constructed with a tunnel source IP address corresponding with the IP address assigned to the network controller 520. The reply tunnel IP header 728 also includes a reply tunnel destination IP address, which according to the present invention is any one of the IP addresses assigned to the cellular network interface devices 552, 554, 556 and 558 installed on the subnet A. The reply tunnel IP header 728 may also include control information which is different from the control information stored in the reply IP header 720. In particular, the network controller 520 is configured to construct reply tunnel IP headers 728 as may be required to efficiently tunnel data packets to the network controller 520 and to receive reply data packets back there from. For example, the network controller 520 may construct reply tunnel IP headers 728 using control data such as versions, protocols, type and quality of service, reply ports, etc. as may be required to utilized a desired route between the network controller 520 and the subnet A or to otherwise optimize network performance. Moreover, the network controller 520 is also configured to construct reply tunnel IP headers 728 as may be required to measure or otherwise evaluate the performance of network routes between the network controller 520 and the subnet A such as by including time stamps, and other data as may be useful in reply tunnel IP headers 728. Generally, the reply tunnel IP header 728 encapsulates the reply IP header 726 thereby causing the reply IP header 726 to be ignored by other networks, such as the cellular networks 505 and 510 and the WAN 515.

Upon receiving a reply tunnel packet 724, the subnet controller 540 reads that reply tunnel IP header 728 and stores any useful data contained therein in data tables stored in the subnet controller 540. Thereafter the reply tunnel IP header 728 is removed and the subnet controller 540 reads the reply inner header 726 which includes the subnet IP address of the original subnet data packet 702 and routes the reply IP payload to the appropriate subnet IP address.

Figure 9:
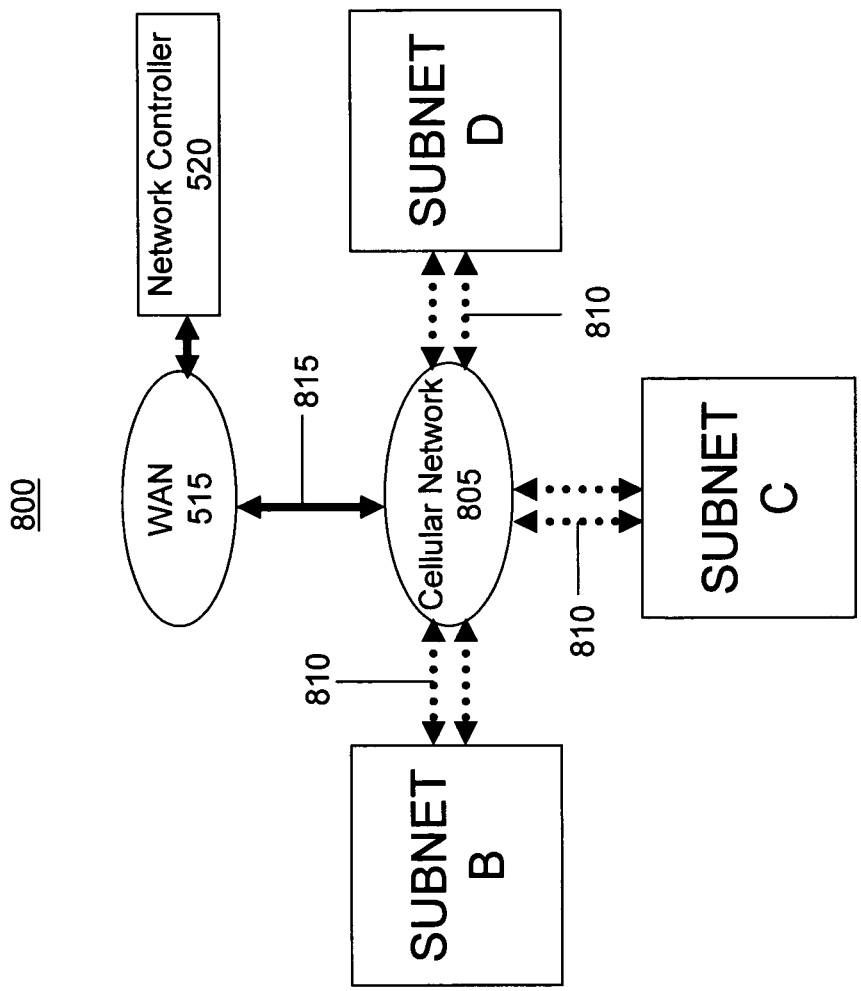
FIG. 9 illustrates a second mobile network configuration according to the present invention.

Referring now to FIG. 9, an expanded network configuration 800 comprises a plurality of mobile subnets B, C and D operating in one or more geographic regions with each mobile subnet B, C and D communicating with a cellular network 805 over at least one wireless communication channel 810. The cellular network 805 includes a gateway 815 to the WAN or Internet 515, or to a private WAN 640, which provides communication access to the network controller 520. In the expanded network configuration 800, the cellular network 805 may comprise a plurality of cellular networks each having a separate gateway 815 to the WAN or Internet 515 or a private WAN 640. In particular, the plurality of cellular networks 805 comprises any wireless network capable of communicating with an appropriately configured mobile subnet and with the WAN 515 or a private WAN 640. More specifically, the plurality of cellular networks 805 may comprise cellular networks disposed over many geographic regions, e.g. disposed globally, and may comprise various cellular network types using different communication frequencies and different communication protocols as well as different user access criteria. Additionally as described above, the cellular networks 805 may comprise public, private, corporate, public safety, government, military or any other type of cellular network and the mobile subnets B, C and D may simultaneously communicate with one or more cellular networks over one or more communication channels. Accordingly, in the expanded network configuration 800, a mobile subnet B, C and D may be capable of movement over a wide geographic region, e.g. substantially globally, while still maintaining an active communication channel with the cellular network 805 and while still exchanging all non-local subnet network traffic with the network controller 520.

Referring again to FIG. 1, according to a further aspect of the present invention, each of the network controller 520 and the subnet controller 540 are configured to exchange network information with each other. The network information exchanged may include configuration data, geographic position data, network performance data, historic data, security data, and any other data as may be required. As described above, each of the network controller 520 and the subnet controller 540 maintains local data tables and or other databases thereon. The data table or database generated by the subnet controller 540 or the network controller 520 may include a top level data field for storing a host device ID, a network route ID, a bus ID, a subnet ID or any other top level data in a top level data field. In addition, the data table or database includes lower level data fields each related to a top level data field for storing characteristics of the device or route identified in the top level data field. Moreover, data fields of the data tables and databases are updated whenever data changes occur or may be updated at regular time intervals ranging from once a second, or less, to monthly or annually, depending upon the nature of the data stored in a particular field.

Accordingly, the network controller 520 and subnet controller 540 each include program steps stored and operating thereon for operating a relational database, for populating data fields, for relating one data field to another and for periodically updating data fields. In addition, the network controller 520 and subnet controller 540 each include program steps stored and operating thereon for reading the data contained in the data fields and for analyzing the data using calculations, algorithms, logical operations, or the like, as may be required to route network data packets and to optimally select network routes as network conditions change. Moreover, the network controller 520 and subnet controller 540 each include program steps stored thereon and hardware as may be required to measure or otherwise quantitatively analyze network performance, e.g. by measuring network route characteristics such as latency, bandwidth and congestion, vs time of day and other factors, by measuring cellular network characteristics such as access point GPS coordinates, access point signal strength vs GPS coordinates, by tracking the GPS coordinates and time of day of drops, handoffs, roaming handoffs, and the like, and by tracking network configurations, peak network traffic and other characteristics of the network environment. In addition, the network controller 520 and the subnet controller 540 each include program steps stored thereon for communicating with each other and with other network controllers as may be required to exchange network operating information and network route information as may be required.

As an example of process steps performed by the subnet controller 540, upon power up, the subnet controller 540 determines which network interface devices are installed on the subnet controller 540, determines the MAC address or other device ID of each network interface device and assigns a separate bus to each network interface device. Thereafter the MAC address and a bus ID are stored in a top level data field of a data table or database. The subnet controller 540 then determines which client devices are locally reachable over each bus ID, assigns a subnet IP address to each locally reachable client device, enters the subnet IP addresses into lower level data fields of the data table or database and relates client device IP addresses or other device ID's to appropriate bus ID's, network interface device ID's, or other top level data fields.

In one example, a data table includes a top level data field containing a bus ID and a plurality of related data fields listing the subnet IP addresses of each device reachable over the bus ID. The data table also includes a plurality of data fields related to each subnet IP address for storing data packet source IP addresses, destination IP addresses, reply port assignments, and other control data associated with data packets originating from and routed to the subnet IP address. Accordingly, a data table may include top level data fields for storing network interface device ID's, bus ID's or the like, and lower level data fields related to each top level data field for storing a list of device ID's reachable over the network interface device and for storing data suitable for tracking communication sessions and data packets associated with each communication session. In addition, data tables or databases may include a plurality of global data fields that relate to all other data fields for storing global data such as a subnet ID, time stamps, GPS coordinates of the mobile subnet vs time stamp, and other global data as may be useful.

In further aspects of the present invention, the cellular network interface devices 552, 554, 556, 558 installed on subnets A or B-D are capable of determining characteristics of the cellular networks 505, 510, 805 such as cellular network type, access point signal strength, or the like and the subnet controller 540 is configured to collect characteristics of the cellular networks and store the characteristics of cellular networks in data tables or databases associated with global data fields such as GPS coordinates and time stamps to map cellular network characteristics. In particular, upon power up, each cellular network interface device 552, 554, 556, 558 determines if there are any properly configured cellular network access points locally available to connect with and if so, measures the signal strength of all of the locally available cellular network access points. In addition, if other information about the cellular network access points is available, such as access point ID, GPS coordinates, cellular network type, or the like, that data is stored in data tables maintained by the mobile subnet and related to a corresponding cellular network.

Thereafter, each cellular network interface device 552, 554, 556, 558 may connect to a cellular network and may be assigned an IP address by the cellular network and the assigned IP address is stored in a table data field that relates to the cellular network interface device ID and or bus ID. Accordingly, the subnet controller 540 generates data tables, including historical data, that are usable to store global data such as time stamps and GPS coordinates, to store subnet configuration data, to store characteristics of cellular access points local to the subnet, to store IP addresses assigned to the subnet by cellular networks, to store a subnet IP address for each locally reachable device, to store data packet header data such as destination IP address, source IP address, subnet reply port assignment and other packet header control data, to store network routes assigned to each data packet and to store network.

Referring to FIGS. 1 and 9, during normal operation each subnet controller 540 controls the flow of network traffic in the mobile subnets A, B, C, D using data tables to track activity. As described above, each subnet A, B, C, D uploads substantially all non-local network traffic to the network controller 520, which receives the uploaded traffic and routes it to destination IP addresses on the WAN 515 or on a private WAN 640. As further described above, the network controller 520 receives substantially all reply traffic responsive to the subnet uploads and downloads the reply traffic to appropriate mobile subnets A, B, C, D.

As described above, mobile subnets A, B, C, D are configured to monitor network information that is able to be monitored or is otherwise obtainable by the subnet mobile router 525 and to compile the network information obtainable by the subnet mobile router 525 in a data table or database maintained on the subnet mobile router 525. In particular, as mobile subnets A-D move over a geographic region each subnet mobile router monitors the performance of cellular networks that it communicates with by recording access point signal strength, signal noise, connection hand-offs, connection drops, roaming boundaries, and other factors, and correlates the cellular network information with GPS coordinates, time stamps, network type, network traffic type and other factors, and the cellular network performance data is compiled in a data table or database maintained on each mobile subnet A-D.

In addition each subnet controller 540 is configured to monitor the performance of each network route used by the network controller 520 to download network traffic to the mobile subnet. Accordingly the mobile router 525 of each mobile subnet A-D uses whatever data is available to it to determine the data packet latency, route bandwidth and route congestion of upload routes according to which cellular network interface device 552, 554, 556, 558 the upload route is associated with, and the upload route data is compiled in the data tables or databases maintained on the mobile router 525. Similarly, the subnet controller 540 monitors the performance of the local subnets 530 and 535, by determining the average bandwidth, congestion, and other characteristics of each subnet such as data type, device type and the like, and the subnet data is compiled in the data tables or databases maintained on the mobile router.

Accordingly, each mobile router 525 maintains a limited historic record of network data compiled in various data tables and databases and periodically updates the data as conditions of the network change. In addition, subnet controllers 540 may analyze instantaneous network conditions and historic data to optimize the performance of the mobile subnet. Moreover, the subnet controllers 540 are configured to generate "subnet network updates," comprising network information obtained by and stored on the subnet controller, and to upload the subnet network updates to the network controller 520. The subnet network update generally comprises the limited historic record of data stored on the mobile subnet and clears fields of the data tables stored on the mobile subnet to free up memory space on the mobile router for storing more data. Accordingly, by uploading subnet network updates to the network controller 520, each mobile router 525 can be configured with less memory capacity than might otherwise be need to evaluate network performance. Meanwhile, a compressive historic record of the data complied by the mobile routers of each mobile subnet A-D and uploaded to the network controller 520 in subnet network updates is stored on the network controller 520 which generally includes significantly more memory capacity than the mobile routers.

Subnet network updates may include a brief or "basic update" listing the mobile subnet ID, a list of subnet public IP addresses assigned to the mobile subnet, the number of client devices being hosted by the subnet, as well as average network traffic bandwidth, average or instantaneous route latency, bandwidth peaks or bursts, and congestion data, a limited historic record of mobile subnet GPS coordinates, heading and velocity, cellular network access point ID's, signal strengths, cellular network types, drops, handoffs, roaming handoffs, queue times, link quality and any other data that may be useful and that is likely to change frequently. Preferably, basic updates contain a limited amount of data in order to avoid congesting the network routes to the network controller 520. Accordingly, a basic update preferably includes data relating to changes in network information or other differences from prior basic updates. In cases where network conditions are changing quickly, e.g. when the mobile subnet is moving, it is desirable to send frequent basic updates, every 1-5 seconds or more frequently as may be required. In cases where network conditions are slowly varying, e.g. when the mobile subnet is substantially stationary, or network traffic is minimal, the frequency of basic updates can be varied by the subnet controller 540 according to the instantaneous conditions of the subnet.

In addition to basic updates, mobile subnets may periodically upload a "comprehensive update" to the network controller 520. Comprehensive updates may be uploaded upon initial start up or at other occasions wherein a subnet changes configuration. Comprehensive updates may also be uploaded on a schedule such as one per hour, once per day or as required. Comprehensive updates may include limited historical data such as usage logs, cellular network data and other historical data that is not uploaded in basic updates. In addition, comprehensive updates may include uploading data packets usable to test or otherwise measure the instantaneous latency, bandwidth and congestion of each upload route.

Referring now to FIG. 9, upon receiving a basic or comprehensive update from a mobile subnet A-D, the network controller 520 reads the mobile subnet ID from the update and establishes or updates a data fields relating to the mobile subnet and to each upload route between the subnet and the network controller. Accordingly, the network controller 520 is configured to maintain a data table or database for each mobile subnet for storing the mobile subnet ID or the like in a top level data field and storing data relating to the top level mobile subnet ID in related data fields and for storing performance data relating to each upload route associated with the mobile subnet. Data relating to the top level mobile subnet ID may include IP addresses assigned to the cellular network interface devices 552, 554, 556, 558 installed on the mobile subnet, historic IP addresses that were previously assigned to the cellular network interface devices 552, 554, 556, 558 installed on the mobile subnet, download route performance data, mobile subnet configuration data, subnet network traffic data, cellular network characteristic data, and the like. Accordingly, the network controller 520 is configured to receive network updates from each mobile subnet A-D, to store the data contained in network updates in data tables or databases operating on the network controller 520, to continuously or periodically analyze the data contained in the data tables or databases relating to network updates.

Referring now to FIGS. 2 and 9, the network controller 520 monitors its own configuration and the performance of network routes used by the network controller 520 and stores network information in data fields or tables and or databases maintained on the network controller 520. In particular, the network controller 520 is configured to maintain a list of IP addresses assigned to each mobile subnet A-D and to associate a network route with each IP address. In addition, the network controller 520 is configured to monitor the upload performance of the network routes between each mobile subnet A-D and the network controller 520 and to store upload route performance data in data fields that relate to corresponding mobile subnets. The network controller 520 is also configured to generate "network controller updates" that include upload route performance, and to download the network controller updates to each mobile subnet A-D.

Referring now to FIG. 1 the network configuration 500 includes four IP tunnels or four network routes extending between the network controller 520 and the subnet A. In one example of operation of the mobile subnet 500, the mobile router 525 measures the characteristics of each download route, e.g. latency, bandwidth and congestion, based on download traffic received from the network controller 520 and stores characteristics of each download route on the mobile router. Thereafter, the mobile router 525 periodically compiles a subnet network update which is uploaded to the network controller 520. In response to receiving the subnet network update, the network controller 520 updates data fields stored thereon according to the subnet network update.

Similarly, the network controller 520 measures the characteristics of each upload route, e.g. latency, bandwidth and congestion based on upload traffic received from the mobile subnet A and stores characteristics of each upload route on the network controller 520. Thereafter, the network controller 520 periodically compiles a network controller update which is downloaded to the mobile router 525. In response to receiving the network controller update, the mobile router 525 updates data fields stored thereon according to the network controller update.

In one example embodiment, the network controller 520 analyzes data relating to the network controller 520, the mobile subnet A and the characteristics of each upload and download route and formulates both an upload routing scheme and a download routing scheme suitable for optimizing network performance. Thereafter, the network controller 520 downloads the uploading data scheme to the mobile router 525 which implements the uploading data scheme. Meanwhile the network controller 520 implements the downloading routing scheme.

In a second example embodiment, the network controller 520 analyzes data relating to the network controller 520 and the characteristics of each download route and formulates a download routing scheme suitable for optimizing network performance and implements the download routing scheme. Meanwhile, the network controller 520 analyzes data relating the network controller 520 and the characteristics of each upload route and formulates an upload routing scheme suitable for optimizing network performance and communicates the upload scheme to the mobile router.

Each routing scheme generally includes a set of criteria usable to select network routes. In the case where only one network route is available the routing scheme defaults to sending all download and upload network traffic over one network route. With two network routes available, various routing schemes are usable to divide network traffic over the available routes. As the number of available network routes between the mobile subnet A and the network controller 520 increases, the selection of efficient or optimum routing schemes becomes more complex. Ideally an optimum routing scheme maximizes bandwidth and minimizes overall latency and congestion on each network route. Since a network route performance is often different depending on the direction of data flow, (download or upload) the upload scheme is generally different from the download scheme.

In some situations the upload and download schemes may not optimize network performance but address other considerations such as data type, security, reliability, cost, or IP destination address. Accordingly, each of the mobile router 525 and the network controller 520 is configured to receive user inputs and factor user selectable routing criteria into the process of establishing routings schemes as required.

One example routing scheme may comprise routing all voice traffic over the network route with the lowest latency while routing all video traffic over the network route with the highest bandwidth and least congestion. Another example routing scheme may comprise routing all traffic over the lowest cost cellular network available, unless there is an urgent need or bandwidth requirement to route traffic over other cellular networks.

The network controller 520 receives subnet network updates from mobile routers and the subnet network updates include cellular network data relating to the cellular networks 505, 510 and 805. In addition, the network controller 520 may receive network updates directly from the cellular networks 505, 510 and 805 with addition cellular network data. According to a further aspect of the present invention, the network controller 520 is configured to compile and analyze the cellular network data in order to formulate routing schemes and otherwise optimize network performance. In particular, the cellular network data may include cellular network access codes or security data, cellular network access prices and use rules, geographic regions covered by the cellular network, IP addresses reachable over the cellular network, the location of cellular network access points, the signal strength of cellular network access points at various GPS coordinates, access point hand-off and drop histories, cellular network roaming boundaries, affiliated cellular networks, average and peak bandwidth, average and peak congestion, average and peak latency and other characteristics of each cellular network. In addition, the cellular network data may be correlated with time of day, week of the year, weather conditions and other factors that may affect the cellular network performance.

Accordingly, the network controller 520 may be configured to compile the cellular network data and to form a landscape representation of cellular network access points encountered by a mobile subnet and to use the landscape representation in order formulate network routing schemes and or otherwise improve network performance. In particular, the network controller 520 may be configured to use the cellular network landscape representation to predict when drops, hand-offs or roaming changes may occur for a particular mobile subnet and to adjust network traffic routing schemes accordingly. In particular, the network controller 520 may redirect download traffic over a different network route in order to avoid a drop by a cellular network. In particular, the network controller 520 may send a controller network update to a subnet instructing the subnet to redirect upload traffic over a different network route in order to avoid a drop. In another example, the network controller 520 may use historical cellular network data along with the GPS coordinates, heading and velocity of the subnet to predict which cellular network access point the subnet will be handed off to and make adjustments to network routing schemes in order to avoid a connection drop or data interruption. In particular, the subnet controller 520 may route a download to a different cellular network or access point before a hand off or a drop occurs in order to avoid a drop or interruption. Accordingly, the network controller 520 includes program steps for predicting the mobile subnet GPS coordinates where a future hand-off or drop may occur and for rerouting the download traffic accordingly. In addition, the network controller 520 keeps a historic list of subnet IP address associated with each mobile subnet and if a reply packet is associated with an inactive subnet IP address, the reply data packet can be downloaded to the appropriate subnet using an active subnet IP address as a destination address.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. a mobile network router, those skilled in the art will recognize that its usefulness is not limited thereto and that the present invention can be beneficially utilized in any number of environments and implementations including but not limited to any network environment. Accordingly, the claims set forth below should be construed in view of the full breadth and spirit of the invention as disclosed herein.

What we claim:

1. A network comprising:
   a network controller operating as a WAN node comprising a controller microprocessor, a controller memory module interconnected with the controller microprocessor and a WAN network interface device forming a network interface between a WAN and the controller microprocessor;
   a mobile router operating as a network interface between one or more local subnets and a cellular network that includes a network gateway to the WAN, comprising a subnet controller, a subnet memory module interconnected with the subnet controller, a network interface device forming a network interface between locally reachable network devices and the subnet controller and a plurality of cellular network interface devices forming a network interface between the subnet controller and the cellular network;

program steps stored and operating on the mobile router for routing subnet exit data packets to the network controller over any one of the plurality of cellular network interface devices; and, program steps stored and operating on the network controller for routing subnet exit data packets to destination IP addresses listed therein including destination IP addresses on the WAN, for receiving reply data packets responsive to the subnet exit data packets, and for routing the reply data packets to the one or more mobile subnets over any one of the plurality of cellular network interface devices.

2. The network of claim 1 wherein the mobile router further comprises means for determining a global position of the mobile router installed thereon.

3. The network of claim 2 wherein the mobile router further comprises program steps stored and operating thereon for generating subnet data fields, for collecting network data obtainable by the mobile router and for storing the network data obtainable by the mobile router in the subnet data fields.

4. The network of claim 3 wherein the mobile router further comprises program steps stored and operating thereon for generating subnet network updates based on the network data obtainable by the mobile router and stored in the subnet data fields and for periodically uploading the subnet network updates to the network controller.

5. The network of claim 1 wherein the network controller further comprises program steps stored and operating thereon for generating controller data fields, for collecting network data obtainable by the network controller and for storing the network data obtainable by the network controller in the controller data fields.

6. The network of claim 5 wherein the WAN network interface device forming a network interface between the WAN and the controller microprocessor comprises a plurality of WAN network interface devices forming a network interface between the WAN and the controller microprocessor and further wherein the program steps stored and operating on the mobile router for routing subnet exit data packets to the network controller over any one of the plurality of cellular network interface devices further include steps for routing subnet exit data packets to any one of the plurality of WAN network interface devices forming a network interface between the WAN and the controller microprocessor.

7. The network of claim 1 wherein the network controller further comprises a second WAN network interface device forming a network interface between a second WAN and the controller microprocessor.

8. The network of claim 1 wherein the network controller further comprises a LAN network interface device interconnected between a LAN and the controller microprocessor.

9. The network of claim 1 wherein the network controller further comprises a user interface device.

10. The network of claim 1 wherein the mobile router is assigned a subnet ID and wherein the program steps stored and operating on the mobile router for routing subnet exit data packets to the network controller over any one of the plurality of cellular network interface devices include program steps for including the subnet ID in a header off each subnet exit data package.

11. The network of claim 1 wherein the mobile router comprises a plurality of substantially similar mobile routers operating simultaneously to exchange network traffic between a plurality of mobile subnets and the network controller.

12. A method for operating a mobile network comprising the steps of:

operating a network controller as a WAN node;

operating a mobile router including a subnet controller configured to form a network interface between one or more local subnets and a cellular network that includes a network gateway to the WAN;

establishing a plurality of communication channels between the subnet controller and the cellular network;

routing subnet exit data packets originating in the one or more local subnets to the network controller over any one of the plurality of communication channels;

routing each subnet exit data packet received by the network controller to a destination IP address listed therein, including destination IP addresses on the WAN;

receiving reply data packets responsive to the subnet exit data packets in the network controller; and, routing the reply data packets to the mobile router over any one of the plurality of communication channels.

13. The method of claim 12 further comprising the step of storing data relating to network performance characteristics of each of the plurality of communication channels that is obtainable by the mobile router on the mobile router.

14. The method of claim 13 further comprising the step of storing data relating to the network performance characteristics of each of the plurality of communication channels that is obtainable by the network controller on the network controller.

15. The method of claim 14 further comprising the step of exchanging data relating to the network performance characteristics of each of the plurality of communication channels between the mobile router and the network controller.

16. The method of claim 15 further comprising the step of formulating one or more routing schemes for selecting which of the plurality of communication channels to route data packets over, wherein the routing schemes are based on data relating to the network performance characteristics of each of the plurality of communication channels that is obtainable by the mobile router and that is obtainable by the network controller.

17. The method of claim 16 further comprising the step of storing data relating to the network performance characteristics of the cellular network that is obtainable by the network controller on the network controller.

18. The method of claim 17 further comprising the step of storing data relating to the network performance characteristics of the cellular network that is obtainable by the mobile router on the mobile router.

19. The method of claim 18 further comprising the step of exchanging the data relating to the network performance characteristics of the cellular network that is obtainable by the network controller and by the mobile router between the mobile router and the network controller.

20. The method of claim 12 wherein the cellular network comprises a plurality of different cellular networks each having a network gateway to the WAN and further wherein the step of establishing a plurality of communication channels between the subnet controller and the cellular network includes establishing a communication channel between the subnet controller and at least two different cellular network types.

21. The method of claim 12 wherein the mobile router comprises a plurality of mobile routers each interfaced with at least one mobile subnet and wherein each of the plurality of mobile routers performs the steps of establishing a plurality of communication channels between each of the mobile routers and a cellular network that includes a network gateway to the WAN;

routing subnet exit data packets originating in mobile subnets to the network controller over any one of the plurality of communication channels established between each of the plurality of mobile routers and a cellular network; and, wherein the network controller performs the steps of;

tracking which of the plurality of mobile routers each of the subnet exit data packets is received from;

routing each of the subnet exit data packets to a destination IP address listed therein, including destination IP addresses on the WAN;

receiving reply data packets responsive to each of the subnet exit data packets;

determining which of the subnet exit data packets each reply packet is responsive to and the corresponding mobile router to send the reply data packet to;

routing the reply data packet to the corresponding mobile router over any one of the plurality of communication channels established between the corresponding mobile router and the cellular network.

* * * * *